No. 876,516. PATENTED JAN. 14, 1908.
H. D. BAUMFALK.
METHOD AND MEANS FOR PREPARING THE BACKS OF BOOKS FOR BINDING.
APPLICATION FILED JAN. 21, 1907.
4 SHEETS—SHEET 1.
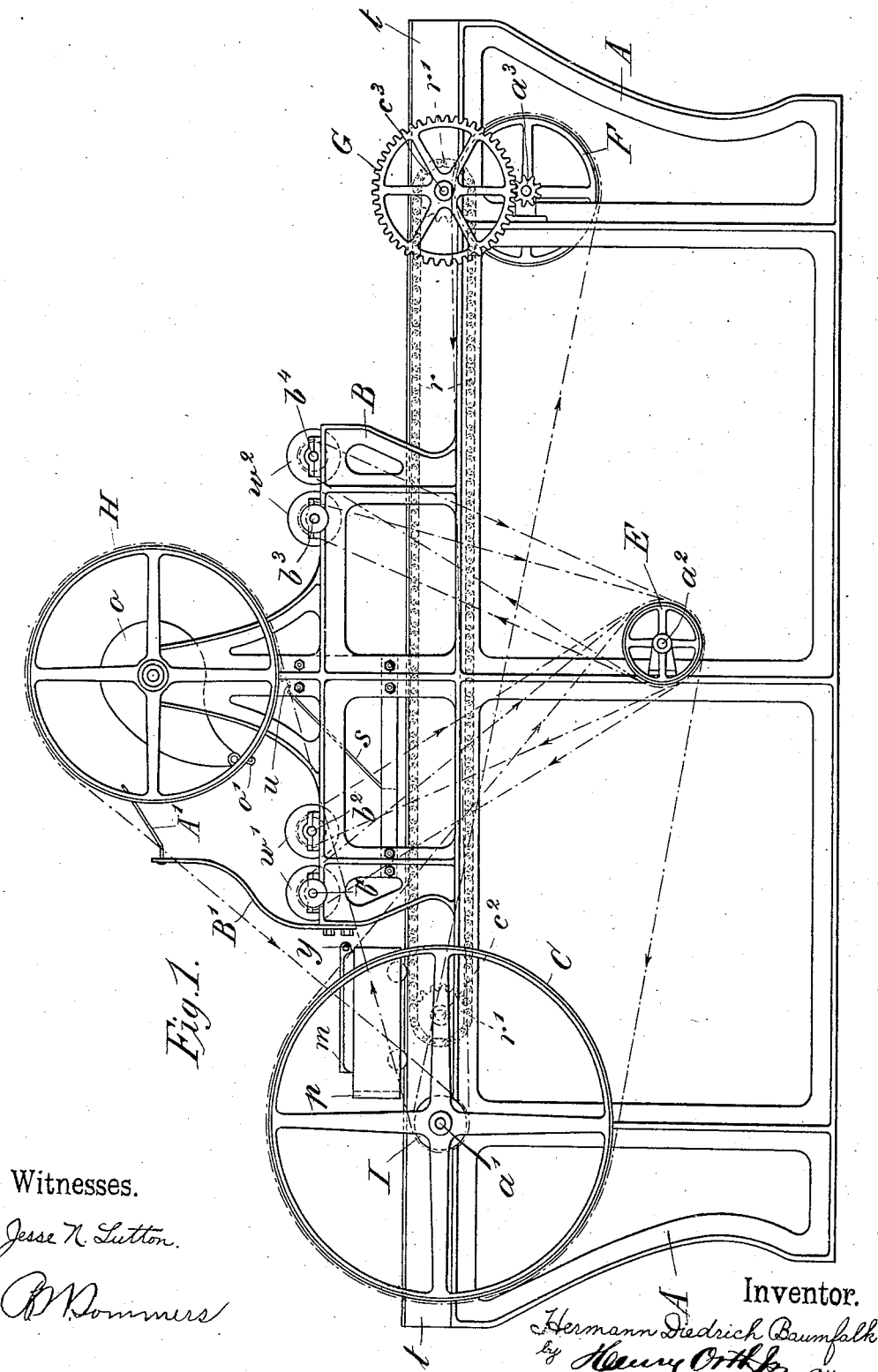
Witnesses.
Jesse N. Lutton.
Inventor.
Hermann Diedrich Baumfalk
by Henry Orth Jr. atty.
THE NORRIS PETERS CO., WASHINGTON, D. C.

No. 876,516. PATENTED JAN. 14, 1908.
H. D. BAUMFALK.
METHOD AND MEANS FOR PREPARING THE BACKS OF BOOKS FOR BINDING.
APPLICATION FILED JAN. 21, 1907.
4 SHEETS—SHEET 2.
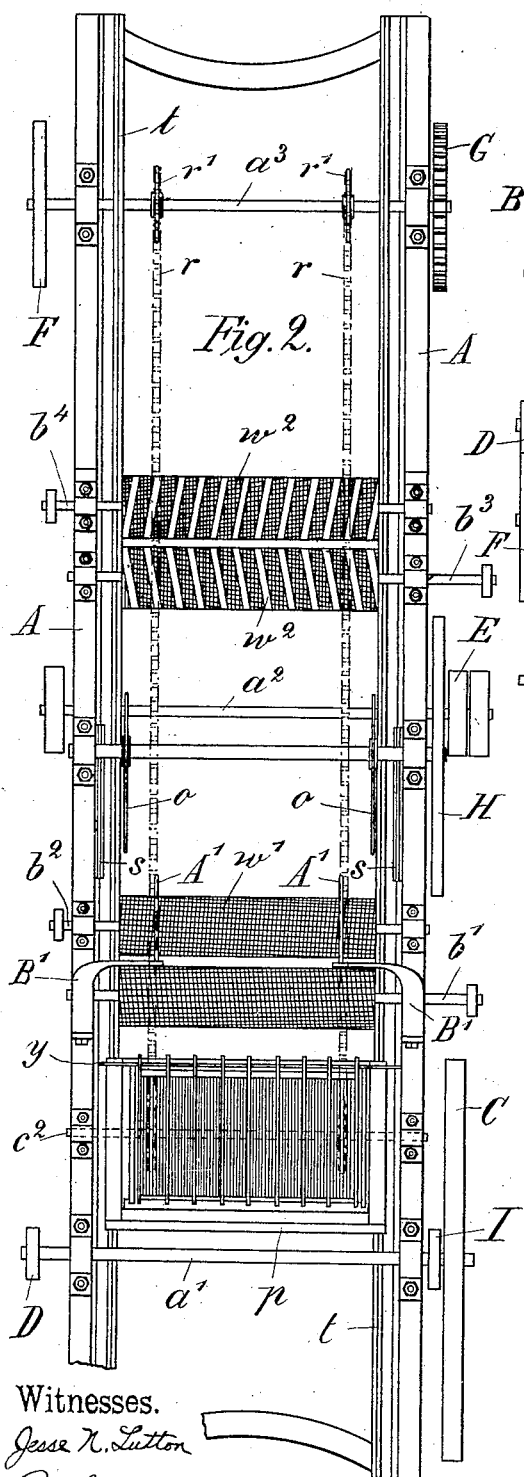
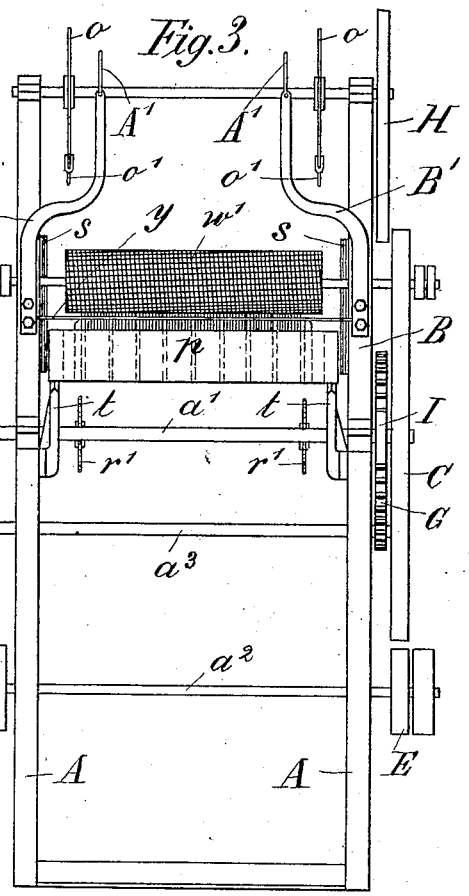
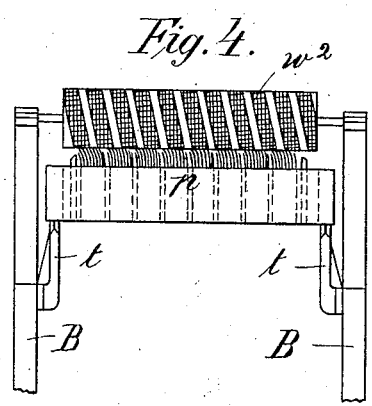
Witnesses.
Jesse N. Lutton
Inventor.
Hermann Diedrich Baumfalk
by Henry Orth Jr.
Atty.

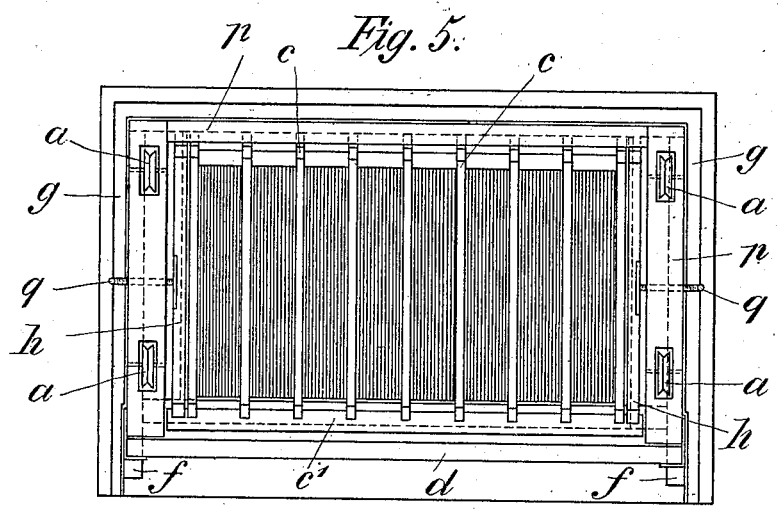
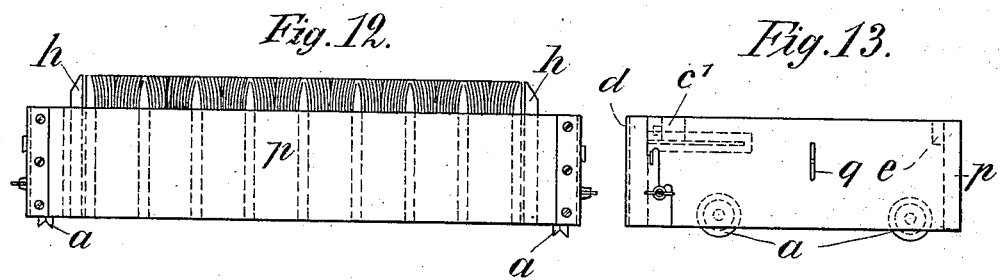
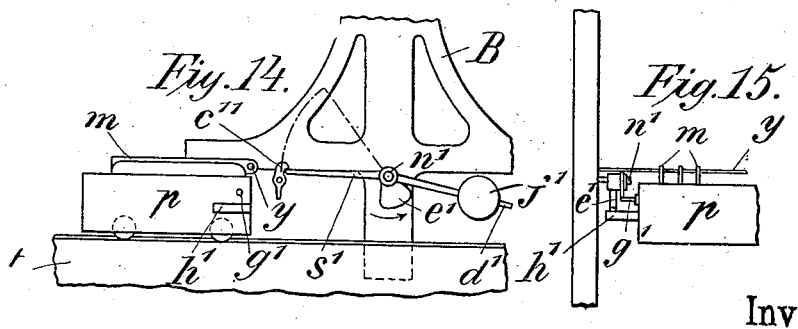

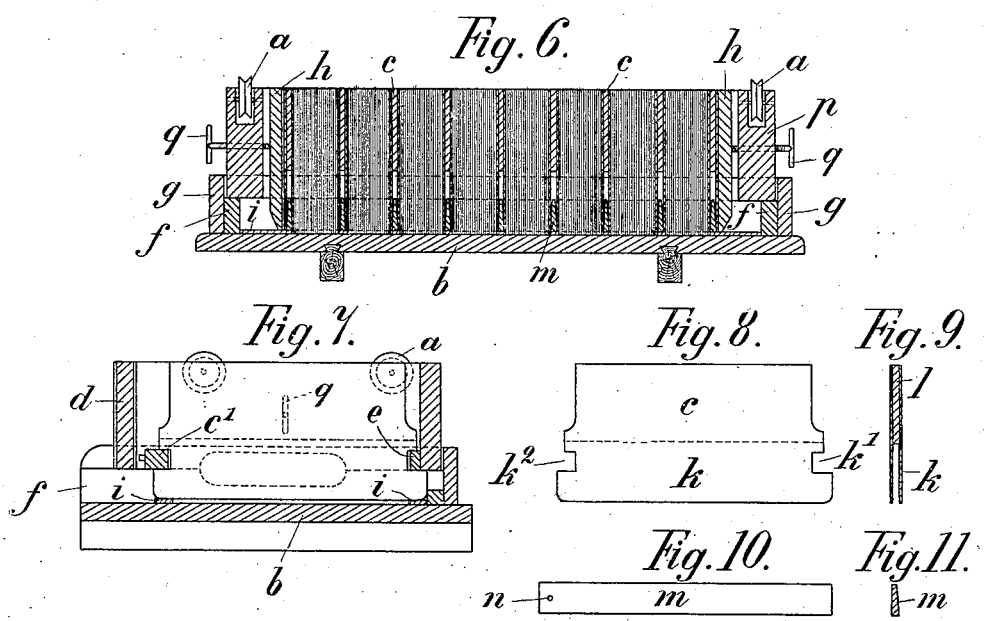

UNITED STATES PATENT OFFICE.

HERMANN DIEDRICH BAUMFALK, OF BANT, GERMANY.

METHOD AND MEANS FOR PREPARING THE BACKS OF BOOKS FOR BINDING.

No. 876,516.     Specification of Letters Patent.     Patented Jan. 14, 1908.

Application filed January 21, 1907. Serial No. 353,394.

*To all whom it may concern:*

Be it known that I, HERMANN DIEDRICH BAUMFALK, a subject of the German Emperor, and resident of Bant, in the Grand Duchy of Oldenburg, Germany, have invented a new and useful Method and Means for Preparing the Backs of Books for Binding, of which the following is a specification.

This invention relates to a method and means for preparing the backs of books for binding without threads.

Heretofore in binding books without threads, it was only possible to produce books, the leaves of which were pasted or glued so close together, that the books opened badly, and it frequently happened that now and then single leaves were not held at all or they were held insufficiently.

According to this invention the back-part of the leaves placed together to form blocks or books is loosened before the adhesive is put on, in such manner that the leaves near the back are sufficiently separated to enable the edges of the leaves to be thoroughly soaked with the adhesive. To this end the leaves piled into blocks or books are first held together nearly up to their back edge and then the back is roughened by a rasp or the like, whereupon for some distance from the back-edge the leaves are released from their hold or pressure and then loosened by being bent sidewise by the aid of special loosening means or by hand. The means for carrying this loosening into effect may be two threaded rolls, which first bend out the ends of the leaves to one side and then to the other. The blocks or books are during this time held in a frame in such manner that up to a prescribed distance from the back edge the leaves are firmly pressed together. Care should be taken, that in roughening up the back the compressed leaves only project for a very short distance and when the roughening or rasping is completed, they are up to a greater distance released from the pressure or hold by removing fillets or strips inserted previously between the book or blocks at this end.

In the drawings showing means to carry out the method similar letters refer to similar parts.

Figure 1 shows an apparatus in elevation, on which the roughening and loosening of the backs of the blocks may be accomplished. Fig. 2 shows a plan and Fig. 3 an end view. Fig. 4 shows part of the machine for bending out part of the leaves sidewise. Fig. 5 shows an inverted view of a frame filled with blocks of leaves. Fig. 6 shows a longitudinal section and Fig. 7 a cross-section of the same. Figs. 8 to 11 show spacing-plates and strips to be inserted between the blocks. Figs. 12 and 13 show the frame in side-elevation and end-view. Figs. 14 and 15 show a modification of means for removing the spacing strips in side-elevation and end-view.

The framing of the machine consists of a lower frame A carrying longitudinal rails $t$ and an upper frame B adapted to support the mechanisms for operating on the backs of books. Three shafts $a^1$, $a^2$ and $a^3$ are journaled in the lower frame A to drive the mechanisms. To the shaft $a^1$ two pulleys C and D are keyed to drive the shafts $a^2$ and $a^3$ by the aid of belts and other pulleys E and F keyed to the last named shafts respectively. On the upper frame B there are four shafts $b^1$, $b^2$, $b^3$ and $b^4$ journaled, of which $b^1$ and $b^2$ carry rolls $w^1$, provided with a roughening or rasping surface and $b^3$ and $b^4$ carry rolls $w^2$, provided on their surface with spiral ribs or screw threads which on the two rolls are wound in different directions. On the top of the lower frame A are bearings for two shafts $c^2$ and $c^3$, which pass through the rails $t$ and carry sprocket-wheels $r^1$ surrounded by chains $r$, the shaft $c^3$ being operatively connected with the shaft $a^3$ by gearings G.

A frame $p$ which is to be filled with the blocks of leaves or the books to be operated upon is adapted to run on the top of the rails $t$ by means of rollers $a$. For filling this frame it is placed upside down on a table or plate $b$ arranged near the machine, and spacing-pieces $c$ are provided, which are of a length somewhat shorter than the inside breadth of the frame. The front wall $d$ of the frame $p$ is made removable and the back-wall is provided with a ledge $e$. Preferably ledges $f$ are arranged on the table $b$ to support the frame $p$ and surrounding these ledges there are guiding pieces $g$ for properly positioning the frame $p$. $h$ are pressure plates to distribute pressure, when the books inside of the frame are compressed, and $i$ are low rails about 3 or 4 millimeters high, on which the spacing pieces $c$ rest, which consist each of a plate $l$ and two metal sheets $k$ of about twice the breadth of the plate $l$, and provided with notches $k^1$ $k^2$ on their sides. $m$ are wedges or wedge-shaped strips of which one is inserted between the projecting ends of the metal-sheets $k$ of each spacing piece $c$ when placed in the frame $p$. The strips $m$ which are longer than the plates are provided with holes $n$ at one end the purpose of which will be described hereafter, and correspond at their thickest end with the thickness of the plate $l$.

To fill the frame $p$ it is placed upside down between guiding-pieces $g$ on the ledges $f$ of the plate $b$. The front wall $d$ is removed and a pressure-plate $h$ is inserted whereupon the leaves are placed in piles or books together with the spacing plates $c$ into the frame in such manner, that the leaves rest on the plate $b$ with their back-edges, while the spacing plates $c$ rest on the rails $i$, so that the leaves project from the rim of the rails $i$ for a distance corresponding to the part to be removed by rasping. Between the projecting ends of the metal-sheets $k$ of each spacing plate a strip $m$ is inserted, in such a way that the ends of these strips provided with the holes $n$ project out at one side of the frame $p$ and all holes are in one line. A long rod $y$ is inserted through holes, so that it is possible to lift the strips up together by this rod. When the last book or pile and another spacing-piece are placed into the frame finally a second pressure-plate $h$ is inserted. The spacing pieces $c$ and the pressure plates $h$ engage with their notches $k^1$ the ledge $e$ on the backwall of the frame, by means of which evenness in the positioning of these parts is secured. Into the opposite notches $k^2$ a bar $c^1$ is placed; whereupon the frontwall $d$ is brought into position and then the complete contents of the frame are compressed by screws $q$ projecting through the end-walls of the frame. The filled frame now is lifted off from the table $b$ and placed with its rolls $a$ downward on the rails $t$ of the apparatus Figs. 1–3, so that the backs of the books or leaves project above the frame. The frame $p$ is taken hold of and drawn across the apparatus by the chains $r$ driven by the sprocket-wheels $r^1$. Hereby the frame is firstly moved under the rolls $w^1$, which are driven by belt gearing from the shaft $a^2$ and are provided with a roughening or rasping surface, so that the backs of the books are rasped and the leaves are somewhat parted from each other and all are given an equally rough edge.

Behind the rolls $w^1$ there is on each side of the frame a bar $s$ arranged on a slope and projecting into the path of the protruding rod $y$, which slides upward on the slanting bars $s$, when the frame $p$ is fed forward, thus withdrawing the wedge-shaped strips $m$ from the distance pieces $c$. When raised to an elevated position the rod $y$ drops into notches $u$, provided at the end of the bars $s$, where it remains until caught hold of by hooks $o^1$ arranged on rotating arms or disks $o$, the shaft of which is journaled in the frame B and carries a pulley H driven by a belt from a pulley I on the main shaft $a'$. On the further rotating movement of the disks $o$ the hooks $o^1$ carry the rod $y$ to arms A′, arranged for this purpose on pillars B′ fixed to the frame B. When the strips $m$ are withdrawn, which during the rasping process serve to compress or support the leaves or sheets sidewise at their edges, the latter are only elastically held by the resilient metal sheets $k$. The frame now passes under the rolls $w^2$, which in the mode of construction shown are also driven by belt-gearing from the shaft $a^2$ and are provided on their surface with spiral ribs or screw thread, wound in different direction, while both rolls are driven in the same direction. If the rolls are driven in different direction the spiral ribs are wound about the rolls in equal direction. Preferably these ribs or threads are roughened so as to secure a decided grip on the leaves. The first of the rolls $w^2$ bend out the leaves to one side, Fig. 4 and the second of these rolls $w^2$ to the other side, the metal sheets $k$ giving way on account of their resiliency. Thus the leaves are well loosened and may be thoroughly soaked on their edges by the gum. For gumming and further treatment the books are carried to some other machine.

In the modification shown in the Figs. 14 and 15 weighted levers $s^1$ are provided for to lift the rod $y$ upward. These levers are normally held by a hook $c^{11}$ projecting into the path of a stud $g^1$ fixed on each side of the frame $p$. When the frame is moved forward, at a certain position the stud $g^1$ trips the hook $c^{11}$ releasing the lever $s^1$ which is rotatable on a pin $n^1$ and is provided on its back-arm $d^1$ with a weight $f^1$. In the moment of its release the front point of the lever $s^1$ projects under the end of the rod $y$, which it raises upward thus removing the strips $m$ from between the books. In its further progress the frame by aid of a projection $h^1$ catches hold of an eccentric or segment $e^1$ arranged on the lever $s^1$ near its pivot $n^1$, to return the lever $s^1$ into its normal position, where it is engaged by the hook $c^{11}$. The rod $y$ may be taken away, when lifted upward, by any desired means for instance by the disk $o$ and hook $o^1$ shown in Fig. 1.

1. I claim:
1. The method of preparing the backs of books for binding, which consists in piling the leaves into books, roughening the back edges of the piles, and then loosening the roughened edges.
2. The method of preparing the backs of books for binding, which consists in piling the leaves into books, compressing the piled leaves in such a manner that a narrow portion at the back is left uncompressed, roughening the edges of the uncompressed portion, releasing the pressure to a greater distance from the back, and bending the released portion first to one side and then to the other.

3. An apparatus for preparing the backs of books for binding, having in combination, a number of roughening rolls, a number of loosening rolls behind the roughening rolls and with means on their surface to bend out the leaves.

4. In an apparatus for preparing the backs of books for binding, a frame, a number of distance pieces mounted in the frame, and removable wedge-shaped strips in the planes of the distance pieces.

5. An apparatus for preparing the backs of books for binding, having in combination, a frame, a number of distance pieces each consisting of a rigid plate and two longer sheets of metal, between which the plate is attached and a number of removable wedge-shaped strips between the projecting parts of the sheets of metal.

6. An apparatus for preparing the backs of books for binding, having in combination, a frame, a number of distance pieces, a number of perforated wedge-shaped strips placed together with the distance pieces inside of the frame, and a rod threaded through the strips and projecting at both ends of the frame.

7. An apparatus for preparing the backs of books for binding, having in combination a movable frame, a number of distance pieces, a number of perforated wedge-shaped strips, a rod threaded through the perforations of the strips and means for raising the said rod to remove the strips from the books during the movement of the frame across the apparatus.

8. An apparatus for preparing the backs of books for binding, having in combination a movable frame, a number of wedge-shaped strips, a rod threaded through the strips, and projecting at both ends of the frame, an inclined bar at each side of the path of the frame adapted to raise said rod when the frame is moved across the apparatus.

9. An apparatus for preparing the backs of books for binding, having in combination a movable frame, a number of wedge-shaped strips, a rod threaded through the strips and projecting at both ends of the frame, means to raise the wedge-shaped strips together with said rod when the frame moves across the apparatus, and means to support the rod in an elevated position.

10. An apparatus for preparing the backs of books for binding having in combination a movable frame, a number of wedge-shaped strips, a rod threaded through the strips and projecting at both ends of the frame, a lower support and a higher support, means to raise the wedge-shaped strips together with the rod to the lower support when the frame moves across the apparatus, and rotatable hooks to carry the rod from the lower support to the higher support.

11. In an apparatus of the character described, a frame adapted to contain blocks of leaves, distance pieces adapted to be mounted between the blocks each comprising a rigid portion and a yielding portion, strips removably mounted in the yielding portions, and means connecting the removable strips.

12. In an apparatus of the character described, a frame adapted to contain blocks of leaves, distance pieces adapted to be mounted between the blocks each comprising a solid portion having parallel yielding members extending beyond the solid portion, wedge-shaped strips having perforations in one end removably mounted between the parallel members, and a connecting rod mounted in the perforations of the strips.

13. In an apparatus of the character described, a frame adapted to contain blocks of leaves, distance pieces adapted to be mounted between the blocks, each comprising a rigid portion and a yielding portion, strips removably mounted in the yielding portion, and means connecting the removable strips, in combination with a support on which the frame is movably mounted, and mechanism to automatically withdraw the strips during the movement of the frame.

14. In an apparatus of the character described, a frame adapted to contain blocks of leaves, distance pieces adapted to be mounted between the blocks each comprising a rigid portion and a yielding portion, strips removably mounted in the yielding portion, and means connecting the removable strips, in combination with a support on which the frame is mounted, means for moving the frame on the support, roughening members adapted to engage the leaves during the movement of the frame, and means controlled by the continued movement of the carriage to withdraw the strips from the distance pieces.

15. In an apparatus of the character described, a frame adapted to contain blocks of leaves, distance pieces adapted to be mounted between the blocks each comprising a rigid portion and a yielding portion, strips removably mounted in the yielding portion, and means connecting the removable strips, in combination with a support on which the frame is mounted, means for moving the frame on the support, roughening members adapted to engage the leaves during the movement of the frame, means controlled by the continued movement of the frame to withdraw the strips from the distance pieces, and means to spread the edges of the leaves after the withdrawal of the strips.

16. In an apparatus of the character described, a frame adapted to contain blocks of leaves, distance pieces adapted to be mounted between the blocks each comprising a solid portion having parallel yielding members extending beyond the solid portion, wedge-shaped strips having perforations in one end removably mounted between the parallel members, a connecting rod mounted in the perforations of the strips, in combination with a support for the frame, means for moving the frame along the support, roughening rolls mounted above the frame in the path of the blocks, means in rear of the rolls adapted to raise the connecting rod, a revolving member adapted to engage the raised rod, and spreading rolls mounted in the path of the blocks adapted to engage the edges of the leaves.

17. Distance pieces for book binding frame, each comprising a rigid portion, flexible parallel plates projecting beyond one edge thereof, and a wedge-shaped strip adapted to be inserted between the projecting plates.

HERMANN DIEDRICH BAUMFALK.

Witnesses:
HUGO SANGEHEINE,
GEORG REMME.